United States Patent Office 3,023,186
Patented Feb. 27, 1962

3,023,186
PROCESS FOR THE DYEING OF SYNTHETIC
POLYAMIDES IN THE MASS
Georg Geiger, Binningen, near Basel, Switzerland, assignor to Sandoz Ltd., Basel, Switzerland
No Drawing. Filed Sept. 12, 1958, Ser. No. 760,537
Claims priority, application Switzerland Sept. 24, 1957
12 Claims. (Cl. 260—37)

This invention relates to a process for dyeing synthetic polyamides in the mass, which consists in the use of condensation products obtained by reacting halogen-containing metal-phthalocyanines with mercaptans in presence of an alkali metal hydroxide and an alcohol, preferably benzyl alcohol.

It is known that synthetic polyamides can be spun-dyed when a finely divided pigment is added to the melt before extrusion. Another known method consists in adding to the monomer a pigment which will withstand the conditions obtaining in subsequent condensation polymerization.

It is also known that halogen-containing metal-phthalocyanines in presence of an alcohol, preferably benzyl alcohol, and caustic alkalis can be reacted with mercaptans to give green pigments suitable for spin-dyeing. These pigments dissolve in benzene hydrocarbons with a green coloration; reference is made in this connection to Swiss Patents 258,299 and 269,707 to 269,710.

Experience has shown that pigments which dissolve in the polyamide melt and are molecularly dispersed in the polyamide filament often prove insufficiently fast to washing in the finished textile goods.

It has now been found that when the pigments referred to in the third paragraph above are incorporated with the polyamide melt, dyeings of the highest fastness to washing can be obtained. In view of the good benzene-solubility of the pigments this discovery is surprising, for it was to be expected that these pigments too would be molecularly dispersed in the spinning mass.

The pigments suitable for the present process are the condensation products of metal-phthalocyanines, which are substituted by 4 to 8 chlorine atoms, with mercaptans, e.g. mercaptobenzene, the 2-, 3- and 4-methyl-1-mercaptobenzenes, the mercaptonaphthalenes, octyl, dodecyl, benzyl mercaptan, etc.

The spun-dyed shades produced with these pigments in nylon, Perlon (nylon type 6, poly epsilon caprolactam) and other polyamide fibers are yellow-green to blue-green, are outstandingly fast to light, gas fumes, washing, perspiration, rubbing or crocking, sublimation, cross dyeing, chlorination and sodium chlorite bleaching, and have excellent heat resistance.

The following examples illustrate the invention. The parts and percentages are by weight and the temperatures are in degrees centigrade.

Example 1

30 parts of the condensation product obtained by reacting 1 mol of octachloro-copper-phthalocyanine with 8 mols of 4-methyl-1-mercaptobenzene in presence of benzyl alcohol and potassium hydroxide are mixed with 5000 parts of nylon 66 (polyhexamethylene adipamide) and the mixture melted by the normal method in a nitrogen atmosphere at about 285°. The thick liquid mass is spun into filament of a yellowish green shade which possesses good fastness to light and wet agencies. The filament can be orientated and/or crimped ("bulked") or shrinkproofed.

The pigment concentration in the polyamide melt can be decreased from 0.5% to 0.1% or increased to 2% without detriment to the shade or the light and wet fastness properties.

Example 2

20 parts of the condensation product obtained by the process of Swiss Patent 269,708, namely reaction of tetrachloro-copper-phthalocyanine with mercaptobenzene in presence of benzyl alcohol and potassium hydroxide, are mixed with 5000 parts of Perlon L (poly epsilon caprolactam) and the mixture melted in the normal way in a nitrogen atmosphere at about 280°. The thick liquid mass is spun to give a bright green filament with good light and wet fastness properties. It can be orientated and/or crimped or shrinkproofed if desired.

Equally good results are obtained with Mirlon and Grilon (polycaprolactams) in place of Perlon L.

Example 3

25 parts of the condensation product obtained according to Swiss Patent 269,709 by reacting tetrachloro-nickel-phthalocyanine with 4-methyl-1-mercaptobenzene in presence of benzyl alcohol and potassium hydroxide are melted with 5000 parts of nylon 66 and the melt spun as described in Example 1. A green filament is obtained which is fast to light, washing, perspiration and water.

In place of the 25 parts of the above-mentioned condensation product, an equal amount of one of the condensation products of tetrachloro-cobalt-phthalocyanine or tetrachloro-iron-phthalocyanine with 4-methyl-1-mercaptobenzene or mercaptobenzene can be used. The shades obtained thus also possess good light and wet fastness.

Example 4

35 parts of the condensation product obtained according to the process of Swiss Patent 269,710 by reacting tetrachloro-copper-phthalocyanine with 2-mercaptonaphthalene in presence of benzyl alcohol and potassium hydroxide are mixed with 5000 parts of Rilson (poly-$\omega$-undecanoic acid) and melted in a nitrogen atmosphere at about 230°. The spun filament is of yellow-green shade and very fast to light and wet treatments. It can be orientated and/or crimped and shrinkproofed.

The following table lists further examples of spun-dyed shades which can be produced in polyamide fibers according to the details given in Examples 1 to 4. The individual examples are characterized by the pigment used, the type of polyamide material and the shade of the spun filament. As the structure of these pigments is not fully known, instead of their chemical names they are characterized by the halogen-containing metal-phthalocyanines on which they are based, the method of producing the same, and the mercapto compound condensed with the halogen-containing metal-phthalocyanine in presence of benzyl alcohol and potassium hydroxide. In Examples 5 to 9 and 11 to 17 the amount of mercaptan required for complete reaction of the halogen is used, whilst in Example 10 only 7 mols of mercaptan to 1 mol of octachloro-copper-phthalocyanine are employed.

In the column headed "Method of production" the abbreviations stand for:

(a) Condensation of the technical mixture of dichlorophthalic anhydride with urea and cupric chloride;
(b) Condensation of the technical mixture of 4-chlorophthalic anhydride with urea and cupric chloride;
(c) Condensation of 2 mols of 3.4-dichlorophthalic anhydride and 2 mols of technical 4-chlorophthalic anhydride with urea and cuprous chloride;
(d) Chlorination of copper-phthalocyanine;
(e) Condensation of 3 mols of 3.4-dichlorophthalic anhydride or the technical mixture of 3.4- and 4.5-dichlorophthalic anhydride and 1 mol of 4-chlorophthalic anhydride with urea and cuprous chloride;
(f) Condensation of 1 mol of 3.4-dichlorophthalic anhydride or the technical mixture of 3.4- and 4.5-dichlorophthalic anhydride and 3 mols of technical 4-chlorophthalic anhydride with urea and cuprous chloride;

(g) Condensation of 3 mols of 3.4-dichlorophthalic anhydride or the technical mixture of 3.4- and 4.5-dichlorophthalic anhydride and 1 mol of phthalic anhydride with urea and cupric chloride;

(h) Condensation of 3.5 mols of 3.4-dichlorophthalic anhydride or the technical mixture of 3.4- and 4.5-dichlorophthalic anhydride and 0.5 mol of phthalic anhydride with urea and cuprous chloride;

(i) Condensation of 2.5 mols of 3.4-dichlorophthalic anhydride or the technical mixture of 3.4- and 4.5-dichlorophthalic anhydride and 1.5 mols of phthalic anhydride with urea and cupric chloride.

caprolactam in the mass which comprises incorporating the essentially unmodified condensation product of 1 mol of octachloro-copper-phthalocyanine with 8 mols of mercaptobenzene into a melt of the polycaprolactam, and spinning the dyed mass into filament form.

7. A level and fast dyed spun filament consisting essentially of synthetic polyamide selected from the group consisting of polyhexamethylene adipamide, polycaprolactam and poly-ω-undecanoic acid and of the reaction product of a chlorinated metal-phthalocyanine having 4 to 8 chlorine atoms and selected from the group consisting of chlorinated copper-phthalocyanine, chlorinated nickel-phthalocyanine, chlorinated cobalt-phthalocyanine and chlorinated iron-phthalocyanine, with a mercaptan selected from the group consisting of mono- and dinuclear

| Ex. No. | Dyestuff | | | Synthetic polyamide material | Shade of spun filament |
|---|---|---|---|---|---|
| | Halogen-containing metal-phthalocyanine | Method of production | Mercapto compound | | |
| 5 | Octachloro-copper-phthalocyanine | (a) | 4-methyl-1-mercapto-benzene | Perlon L | Yellowish green. |
| 6 | Sym. tetrachloro-copper-phthalocyanine | (b) | Benzyl mercaptan | Nylon 66 | Bluish green. |
| 7 | do | (b) | Octyl mercaptan | Rilsan | Do. |
| 8 | Hexachloro-copper-phthalocyanine | (c) or (g) | 3-methyl-1-mercapto-benzene | do | Green. |
| 9 | do | (c) or (g) | 4-methyl-1-mercapto-benzene | Perlon L | Yellow-green. |
| 10 | Octachloro-copper-phthalocyanine | (a) or (d) | do | Nylon 66 | Yellowish green. |
| 11 | Pentachloro-copper-phthalocyanine | (f) or (i) | Octyl mercaptan | Perlon L | Bluish green. |
| 12 | Sym. tetrachloro-copper-phthalocyanine | (b) or (d) | 1-mercaptonapthhalene | Rilsan | Do. |
| 13 | Heptachloro-copper-phthalocyanine | (e) or (h) | Mercaptobenzene | Nylon 66 | Green. |
| 14 | Pentachloro-copper-phthalocyanine | (f) or (i) | Dodecyl mercaptan | Perlon L | Do. |
| 15 | Hexachloro-copper-phthalocyanine | (d) | Benzyl mercaptan | Grilon | Do. |
| 16 | Octachloro-copper-phthalocyanine | (d) | Mercaptobenzene | Perlon L | Yellowish green. |
| 17 | do | (d) | 2-methyl-1-mercapto-benzene | Mirlon | Green-yellow. |

Having thus disclosed the invention what I claim is:

1. A process for the level and fast dyeing of synthetic polyamides in the mass which comprises incorporating a condensation product essentially as obtained by reacting a chlorinated metal-phthalocyanine having 4 to 8 chlorine atoms and selected from the group consisting of chlorinated copper-phthalocyanine, chlorinated nickel-phthalocyanine, chlorinated cobalt-phthalocyanine and chlorinated iron-phthalocyanine, with a mercaptan selected from the group consisting of mono- and di-nuclear aryl mercaptans, benzyl mercaptan and alkyl mercaptans with 8 to 12 carbon atoms in presence of an alkali metal hydroxide and benzyl alcohol, into a melt of a synthetic polyamide selected from the group consisting of poly-hexamethylene adipamide, polycaprolactam and poly-ω-undecanoic acid, and spinning the dyed mass into filament form.

2. A process for the level and fast dyeing of polyhexamethylene adipamide in the mass which comprises incorporating the essentially unmodified condensation product of 1 mol of octachloro-copper-phthalocyanine with 8 mols of 4-methyl-1-mercaptobenzene, into a melt of the polyhexamethylene adipamide, and spinning the dyed mass into filament form.

3. A process for the level and fast dyeing of polycaprolactam in the mass which comprises incorporating the essentially unmodified condensation product of 1 mol of octachloro-copper-phthalocyanine with 8 mols of 4-methyl-1-mercaptobenzene into a melt of the polycaprolactam, and spinning the dyed mass into filament form.

4. A process for the level and fast dyeing of poly-ω-undecanoic acid in the mass which comprises incorporating the essentially unmodified condensation product of 1 mol of hexachloro-copper-phthalocyanine with 6 mols of 3-methyl-1-mercaptobenzene into a melt of the poly-ω-undecanoic acid, and spinning the dyed mass into filament form.

5. A process for the level and fast dyeing of polyhexamethylene adipamide in the mass which comprises incorporating the essentially unmodified condensation product of 1 mol of heptachloro-copper-phthalocyanine with 7 mols of mercaptobenzene into a melt of the polyhexamethylene adipamide, and spinning the dyed mass into filament form.

6. A process for the level and fast dyeing of poly-caprolactam in the mass which comprises incorporating the essentially unmodified condensation product of 1 mol of octachloro-copper-phthalocyanine with 8 mols of mercaptobenzene into a melt of the polycaprolactam, and spinning the dyed mass into filament form.

aryl mercaptans, benzyl mercaptan and alkyl mercaptans with 8 to 12 carbon atoms, said reaction product having been incorporated into said polyamide without special pre-processing of such reaction product.

8. A level and fast dyed spun filament consisting essentially of polyhexamethylene adipamide and of the condensation product of 1 mol of octachloro-copper-phthalocyanine with 8 mols of 4-methyl-1-mercaptobenzene, said condensation product having been incorporated into said polyamide without special pre-processing of such reaction product.

9. A level and fast dyed filament consisting essentially of polycaprolactam and of the condensation product of 1 mol of octachloro-copper-phthalocyanine with 8 mols of 4-methyl-1-mercaptobenzene, said condensation product having been incorporated into said polyamide without special pre-processing of such reaction product.

10. A level and fast dyed filament consisting essentially of poly-ω-undecanoic acid and of the condensation product of 1 mol of hexachloro-copper-phthalocyanine with 6 mols of 3-methyl-1-mercaptobenzene, said condensation product having been incorporated into said polyamide without special pre-processing of such reaction product.

11. A level and fast dyed spun filament consisting essentially of polyhexamethylene adipamide and of the condensation product of 1 mol of heptachloro-copper-phthalocyanine with 7 mols of mercaptobenzene, said condensation product having been incorporated into said polyamide without special pre-processing of such reaction products.

12. A level and fast dyed spun filament consisting essentially of polycaprolactam and of the condensation product of 1 mol of octachloro-copper-phthalocyanine with 8 mols of mercaptobenzene, said condensation product having been incorporated into said polyamide without special pre-processing of such reaction products.

References Cited in the file of this patent
UNITED STATES PATENTS

| 2,345,533 | Graves | Mar. 28, 1944 |

FOREIGN PATENTS

| 123,197 | Australia | Jan. 16, 1947 |
| 258,299 | Switzerland | May 2, 1949 |
| 729,584 | Great Britain | May 11, 1955 |